Feb. 6, 1962 A. W. SCRIBNER 3,019,966

RECORD PERFORATING DEVICE

Filed May 2, 1960 3 Sheets-Sheet 1

INVENTOR
ALBERT W. SCRIBNER
BY Thomas S. Ross
ATTORNEY

Feb. 6, 1962 A. W. SCRIBNER 3,019,966

RECORD PERFORATING DEVICE

Filed May 2, 1960 3 Sheets-Sheet 2

INVENTOR
ALBERT W. SCRIBNER

BY Thomas S. Ross

ATTORNEY

Feb. 6, 1962 A. W. SCRIBNER 3,019,966

RECORD PERFORATING DEVICE

Filed May 2, 1960 3 Sheets-Sheet 3

INVENTOR
ALBERT W. SCRIBNER
BY Thomas S. Ross
ATTORNEY

United States Patent Office 3,019,966

Patented Feb. 6, 1962

3,019,966

RECORD PERFORATING DEVICE

Albert W. Scribner, West Hartford, Conn., assignor to Royal McBee Corporation, Port Chester, N.Y., a corporation of New York Filed May 2, 1960, Ser. No. 25,973
13 Claims. (Cl. 234—50)

This invention relates to a novel type record perforating device and more particularly relates to a novel construction and arrangement for rapidly perforating a record by means of a plurality of laterally swinging shearing blades that cooperate with the notched edge of a shear block assembly.

In conventional type record perforators a plurality of punch elements move substantially axially into cooperation with a corresponding shaped hole in the associated die block so as to punch a circular, rectangular, or any other desired shape of hole in the record tape or card. In this type of device the punch elements are usually reciprocated; the forward stroke serving to punch the desired perforation in the record while the retractive stroke serves to withdraw the punch element from the record perforation so as to permit the record to partake of an incremental feed movement preparatory for a subsequent punching operation. This manner of operation is inherently relatively slow because of the reciprocatory type movement of the punch elements relative to the die block, and also because the time required for the actual record shearing action constitutes only a very small part of the time required for the entire punch cycle. Furthermore, conventionally arranged record punch elements are usually selectively coupled to and uncoupled from a power source, such increasing not only the required mechanics but also the effective inertia and response time of each punch linkage.

One object of the instant invention is to provide a record perforating device whereby a plurality of laterally moving shear blades are adapted to cooperate with the notched edge of a shear block assembly.

Another object of the invention is to provide a novel record perforating device whereby a record perforation is produced by a laterally swinging shear blade that laterally moves through a transversely bent portion of the record.

Another object of the invention is to provide a novel record perforator wherein the lateral swinging movement of the perforating element is continuous and unidirectional.

Another object of the invention is to provide a novel record perforator whereby a plurality of perforating elements are continuously operatively coupled with a power drive means and the said perforating elements are rendered operative by altering the lengths of their normal paths of movement.

Another object of the invention is to provide a novel record perforating device whereby a bent record and a laterally swinging contoured shear blade may be simultaneously moved relative to one another so as to thereby generate a desired perforation in the record.

Still another object of the invention is to provide a novel record tape perforating device whereby a plurality of radially indexible shear blades are mounted on a rotor that is adapted to laterally swing said blades into shearing cooperation with the notched edge of a stationary shear block assembly, the blades being radially indexed by solenoids which are mounted on said rotor and which are respectively controlled through a related brush and commutator disc type of unit.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
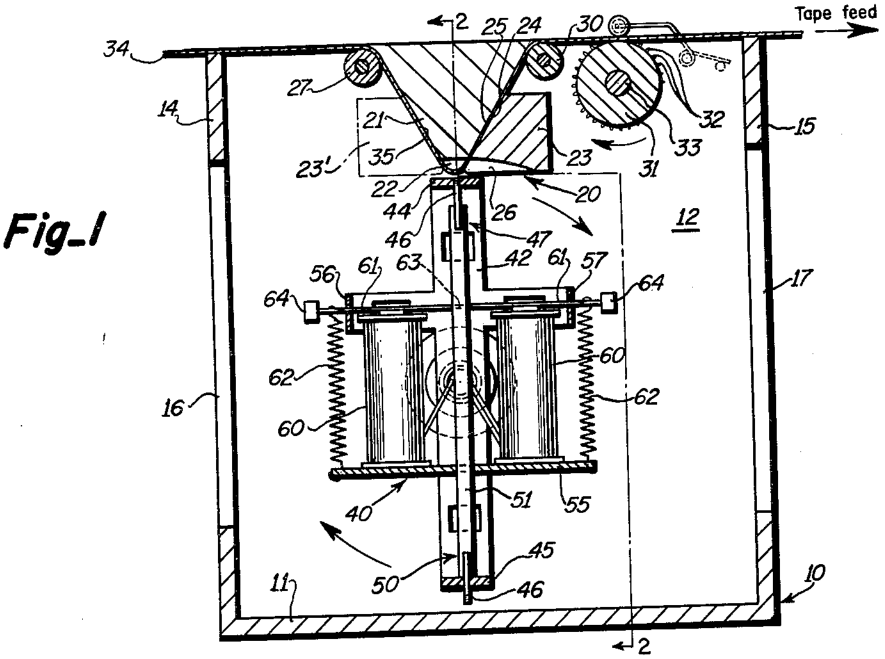
FIGURE 1 is a vertical sectional view of the instant apparatus and is taken along section line 1—1 of FIGURE 2.
Figure 2:
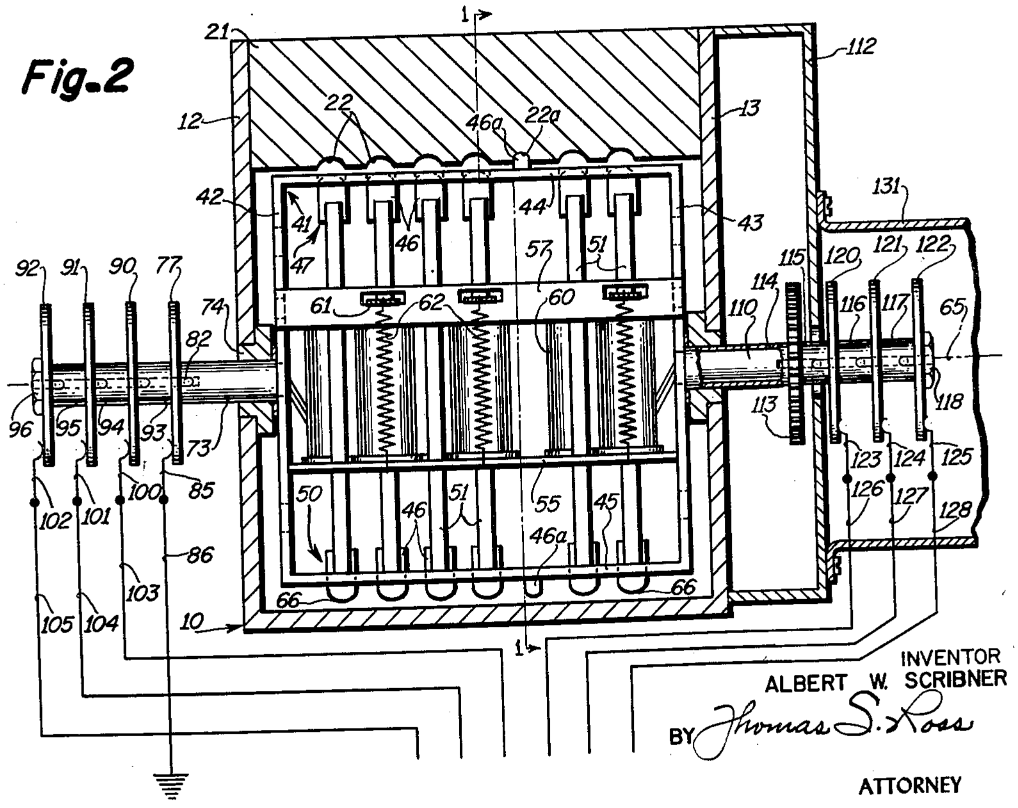
FIGURE 2 is a vertical sectional view taken along section line 2—2 of FIGURE 1.

Referring to FIGURES 1 and 2 there is shown a frame 10 comprising a base 11 to which is fixed a pair of upstanding side plates 12 and 13 and front and back plates 14 and 15 having apertures 16 and 17 formed therein respectively. Connected to and between the upper portions of the side plates is a shear block assembly 20 comprising a first portion or shear block 21 having a plurality of laterally spaced open sided notches 22 formed along the slightly rounded lower apex edge thereof. The second portion or shear block 23 of said assembly has a forward or front face 24 which is parallel to and slightly spaced from a rearward face 25 on said first shear block; said second block also having a plurality of laterally spaced open sided notches 26 formed along the lower edge thereof. The several notches 26 are respectively coextensive with said notches 22. A pair of record guide rollers 27 and 30 are rotatably mounted between the side plates 12 and 13 by any suitable means and are disposed adjacent the upper front and rear sides of the shear block assembly 20. A conventional type tape feed sprocket drum 31 disposed adjacent the guide roller 30 and having the usual circumferential teeth 32 is keyed to a shaft 33 that is rotatably mounted on said frame side plates. A record tape 34 to be perforated is adapted to be passed over the guide roller 27 along the forward face 35 and along a bent path around the scalloped lower edge of block 21, upwardly between the closely adjacent faces 24, 25 of said shear blocks and finally over the guide roller 30 and the driven sprocket drum 31.

Rotatably mounted on and between the frame side plates 12 and 13 is a rotor 40 comprising a rectangular shaped body 41 having sides 42 and 43 which are horizontally and coaxially bored so as to receive and be rigidly connected to the two horizontally extending tubular bearing hubs which are rotatably supported in said frame side plates in a manner to be hereinafter described. The outer horizontal legs 44 and 45 of the rotor body are provided with a plurality of laterally spaced slots and in each of these slots there is disposed a shear blade 46. Each shear blade in the upper set 47, FIGURE 2, of blades is fixedly connected to a corresponding blade in the lower set 50 by means of a diametrally disposed connecting rod 51. The limits of sliding movement of each rod 51 in either radial direction on said rotor is determined by the engagement of either end of the rod with the inner surface of the adjacent horizontal leg 44 or 45 of the rotor body; one such limit being illustrated in FIGURES 1 and 2. Secured between the sides 42 and 43 of the rotor body is a solenoid supporting plate 55 and two offset solenoid armature supporting cross members 56 and 57. Mounted on the plate 55 is a staggered array of six solenoids 60 located on either side of the blade connecting rods 51. Said solenoids are respectively associated with and connected to the respective blade connecting rods 51. Each solenoid has an armature 61 which is pivotally mounted by any suitable means in the adjacent cross member 56 or 57 and is biased to a normal position by a spring 62. The inner end of each armature extends through a slot 63 formed in the adjacent related connecting rod 51 while to the outer end thereof is secured a suitable counterbalance weight 64. As will be apparent energization and de-energization of the solenoids 60 will serve to shift each set of shear blades 46 between radially inner or inoperative positions and radially outer or operative positions. The positions and contour for the profile, as seen in FIGURE 2, of each notch 22 and its related notch 26, FIGURE 1, is determined by the surface of revolution, about the rotor axis 65, of the contoured outer profile or edge 66, as seen in FIGURE 2, of the associated shear blade 46 when the latter is in its radially outer or operative position.

Figure 8:
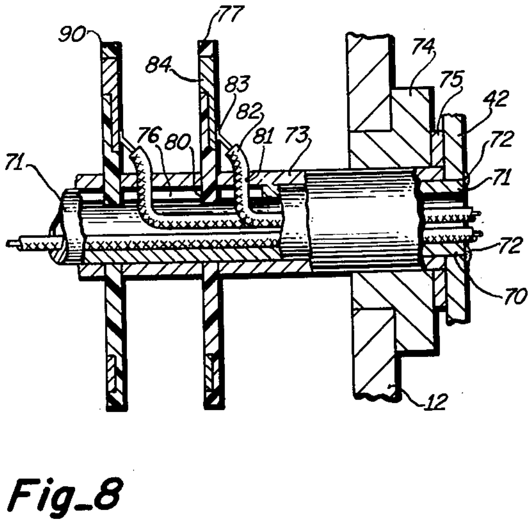
FIGURE 8 is a partial diametral section view of a portion of the commutator control structure and electrical connections.

In that each of the two coaxial rotor hubs are rotatably supported in the frame side plates 12 and 13 in a similar manner a detailed discussion of only one of such mountings will suffice here. Referring to FIGURE 8 the left side 42 of the rotor is provided with an aperture 70 which receives the inner end of a tubular hub 71 that is rigidly fastened to said rotor side by any suitable means such as a weld 72. The hub 71 extends through a first or inner tubular spacer bushing 73 which is rotatably mounted in the flanged bearing bushing 74 secured to frame side plate 12. A thrust washer 76 is coaxially disposed between the rotor side 42 and said bushing 74.

Figure 5:
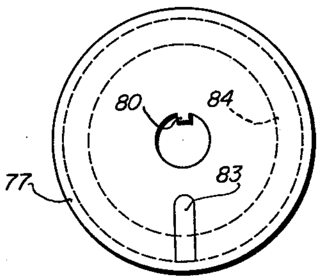
FIGURE 5 is a side elevational view of one of the control commutator discs.

The outer end and the central portion of the tubular hub 71 is formed with an elongated longitudinal slot 76. A first nonconductive commutator disc 77 is mounted on hub 71 in abutting relation with the left end, FIGURE 8, of the first spacer bushing 73; the radially inward extending lug 80 thereof, FIGURES 5 and 8, projecting into said slot 76 so that said disc 77 is rotatably keyed to said hub 71 and rotor 40. An aperture 81 is formed through the upper wall of the tubular spacer bushing 73 so that the common ground wire 82 which is electrically connected to all of the solenoids 60 may be extended from the inside of said tubular hub, through slot 76, and aperture 81 and be connected to the electrical conductive spot 83, FIGURE 5, on the right hand side, FIGURE 8, of the commutator 77. The spot 83 is electrically connected to the annular conductive ring 84 on the lefthand side, FIGURE 8, of said commutator disc. A conventional type brush 85, FIGURE 2, which is adapted to slidably engage said annular ring 84 is connected to an external ground line 86.

Additional similar commutator discs 90, 91 and 92, FIGURE 2, are keyed to the tubular hub 71 and are respectively axially separated by tubular spacer bushings 93, 94 and 95 each of which is provided with an aperture similar to 81 through which a wire leading to a separate one of the solenoids may pass whereby commutator discs 90–92 may be respectively electrically connected to three of the solenoids 60. The said discs and spacer bushings are axially retained in fixed relation to the rotor 40 by means of a headed bolt 96 which threadedly engages the outer end of the tubular hub 71. The brushes 100–102, FIGURE 2, connected to the external control lines 103–105 are adapted to slidably engage the respective annular conductive portions of the discs 90–92 in a manner similar to that for brush 85 and disc 77. The right hand rotor hub 110, FIGURE 2, extends through a gear box 112, FIGURE 2, and has a drive gear 113 keyed thereto by any suitable means, such as the lug 80 used in connection with said disc 77. The spacer bushings 114, 115, 116 and 117 and bolt 118 maintain the gear 113 and the commutator discs 120, 121 and 122 in fixed axial spaced relation; the construction and arrangement of bolt 118, discs 120–122, bushings 115–117 and hub 110 respectively corresponding to that just described for bolt 96, discs 90–92, bushings 93–95 and hub 71. The brushes 123–125 cooperating with discs 120–122 respectively are connected to external control lines 126–128.

Figure 3:
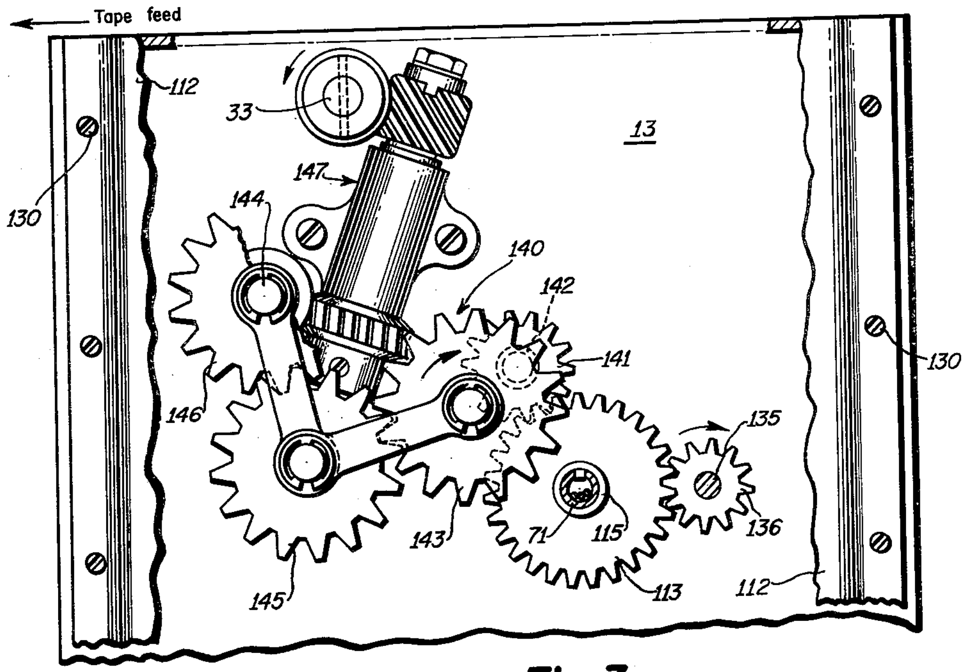
FIGURE 3 is a side elevational view, in partial section, of the transmission gearing of the instant apparatus.
Figure 4:
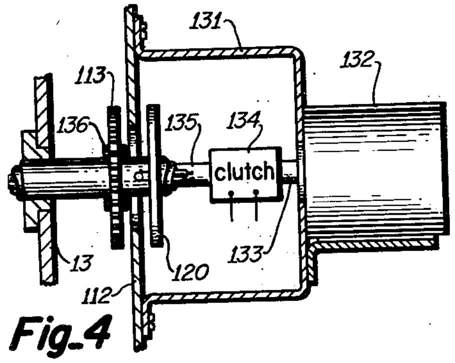
FIGURE 4 is a front elevational view, in partial section, showing the power drive connections for the instant apparatus.

The means for rotatably driving the gear 113 and rotor 40 is illustrated in FIGURES 3 and 4. To the said gear box 112, which is fixedly mounted in the frame side plate 13 by means of screws 130, there is fastened a bracket 131 which supports an electric motor 132. Motor 132 is adapted to drive the input shaft 133 of an electrically operated positive type clutch 134 having an output shaft 135 rotatably mounted in the outer wall of the gear box 112. To the inner end of shaft 135 is fixed a pinion gear 136 which meshes with said rotor gear 113. The gear 113 is adapted to intermittently drive the tape feed sprocket shaft 33 through an intermittent drive mechanism 140. Said drive mechanism comprises a pinion 141 which meshes with gear 113 and which is fastened to a stub shaft 142 rotatably mounted between the frame side plate 13 and the outer side wall of the gear box 112. Eccentrically fixed to shaft 142 is a gear 143 which is adapted to intermittently rotate a shaft 144 that is mounted similar to shaft 142 through gears 145, 146, in a manner which is more fully described in U.S. Patents 2,894,614, 2,900,130 and 1,052,542. The intermittently rotating output shaft 144 is rotatably connected to the said shaft 33 by worm gearing 147 which is similar to that interconnecting the shafts 257 and 266 shown and described in said U.S. Patent 2,894,614; the said gearing 147 being mounted on the outer side of frame side plate 13. Here then as the motor 132 continuously drives the rotor 40 through gearing 113 and 136, the tape feed sprocket drum 31 will be intermittently rotatably indexed by gearing 140 and in timed relation to the rotation of said rotor 40. Any suitable electrically operated clutch may be operatively disposed in the gearing between gear 113 and shaft 33 in order to interrupt the indexing operation of the tape feed sprocket drum 31 at desired times during the continuous rotational movement of the rotor 40. The electrical programming means for the timed initiation of electrical pulses in the control lines 86, 103–105, and 126–128, FIGURE 2, and in the lines to the two above mentioned electrically operated clutches is not shown and forms no part of the present disclosure.

When a record tape is being used in connection with the instant apparatus, the usual small tape feed holes may be formed in the tape by providing small radially extending blades 46a, FIGURE 2, on the rotor 40 which are positioned to cooperate with correspondingly formed notches, such as 22a in said shear block assembly 20. Thus a feed hole will be formed every time one of the sets of blades 46 swings past the notched edge of said assembly 20. If desired a second shear block 23', FIGURE 1, which is constructed and arranged in a manner similar to block 23 may be provided so that the record tape 34 may be fed in a direction opopsite to the normay direction illustrated by arrow 155, FIGURE 1, as the rotor 40 is driven in the same or opposite direction illustrated in FIGURE 1.

Figure 6:
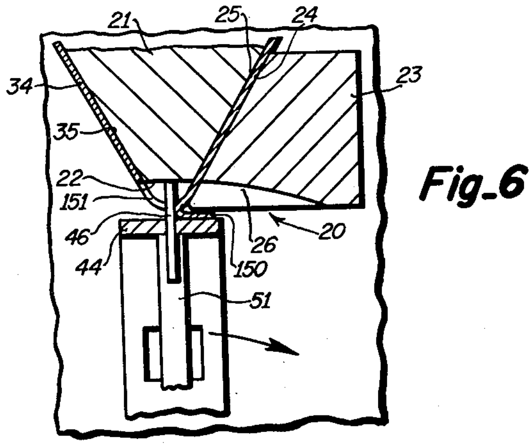
FIGURE 6 is an enlarged active view of a portion of the apparatus shown in FIGURE 1.

In the operation of the above described apparatus the motor 132 normally continuously drives rotor 40 while simultaneously intermittently driving the tape feed sprocket 31 through the gearing 140, 147. During the rotor rotation as each set of shear blades 46 approaches the notched edge of the shear block assembly 20, the respective solenoids 60 are appropriately energized or de-energized in order to leave the various blades of said set in the desired radially extended and retracted positions whereby only said extended or operatively positioned blades may shearingly cooperate with the respectively associated notches 22, 26 so as to thereby form the desired perforations in the record tape 34. This shearing action is illustrated in FIGURE 6. Here the small portion 150 of the record, which is being progressively sheared away by the laterally swinging radially extended shear blade shown, ultimately leaves the desired perforation 151 in the record 34. As the next set of blades swings around in approach of the shear block assembly 20, the tape fed sprocket incrementally indexes the record tape and said solenoids 60 are again appropriately operated so as to radially position each blade of this next set to its desired operative or inoperative position preparatory for the ensuing shearing operation. The actual shearing action, as illustrated, occurs during that period of time when the tape feed sprocket 31 is stationary durin gits said timed intermittent indexing movement.

The various elements supported on the rotor 40 are positioned so that said rotor is statically and dynamically balanced. If needed suitable counterweights may be attached to the rotor. When perforating record tape with standard sized and distributed holes the operative radial stroke for each connecting rods 51 and associated blades 46 may be very small i.e. in the order of .030 inch or less, hence each connecting rod 51 and its two associated blades 46 need never be more than .015 inch or so from a radially balanced position. At any given time the number of blades which are on one side of the radially balanced position will tend to dynamically balance those on the other side of said balanced position.

Figure 7:
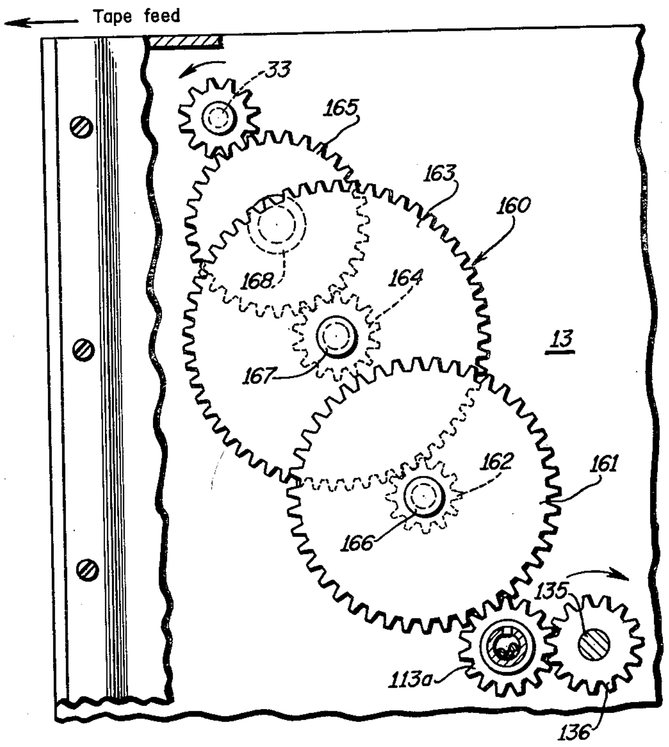
FIGURE 7 is a side elevational view of a transmission gearing for an alternate embodiment of the instant apparatus.

Referring to FIGURE 7 there is illustrated a second embodiment of the instant invention. The construction and arrangement of this device is the same as that described above except that a conventional type speed reducing gear train 160 is provided between shafts 135 and 33 so that the latter may continuously rotate the tape feed sprocket shaft 33 in timed relation to the rotation of rotor 40. The said drive pinion 136 drives the serially meshing gears 113*a*, 161, 162, 163, 164, 165 the latter three of which are suitably mounted on the frame side plate 13 by means of three studs shafts 166, 167 and 168. Gear 113*a* corresponds to gear 113 of FIGURE 3 but has a pitch diameter of smaller diameter than that of said gear 113. Here the blades 46 and the record tape 34 move in the same general direction past the notched edge of the shear block assembly 20 hence the effective shearing speed is equal to the difference between the tape and blade speeds. However in that the linear tape feed speed is virtually negligible compared to that for the blades 46, substantially the same record shearing rate is produced. Here the contour of the outer edges 66, FIGURE 2, of the blades 46 and the similar contour of the related notch profiles in the shear block assembly 20 are made so that the combined effect of the said contouring coupled with the shearing rate of the moving tape and blades dynamically generates the desired shape of perforation in the record. In this arrangement even higher perforating speeds may be attained in that both the rotor and tape feed movements are continuous and unidirectional. It will be understood that the speed ratio between rotor 40 and tape feed sprocket 31 will determine the longitudinal pitch of successive perforations which may be formed in the record.

While several embodiments of the invention have been shown and described, it will be apparent to those skilled in the art that numerous variations and modifications may be made in the particular construction without departing from the underlying principles of the invention. It is therefore desired, by the following claims, to include within the scope of the invention all such variations and modifications whereby substantially the results of the invention may be obtained by the use of substantially the same or equivalent means.

The invention claimed is:

1. Record perforating apparatus; comprising a frame, a shear block assembly secured to said frame and formed along an apex edge with a plurality of spaced open side notches, said notches each having a shear cutting edge, means for feeding a record along a bent path around the said notched edge of said shear block assembly, a plurality of shear blades, the outer ends of said blades having contoured shear cutting edges, means on said frame for supporting said blades for swinging movement so that said contoured blade cutting edges swing into, through and out of the respectively associated notches during the unidirectional swinging movement of said blades, the shear cutting edges of said notches lying on the surfaces of revolution generated by the said contoured shearing edges of the respectively associated blades when the latter are swung past said shear block assembly, said outer ends of said blades thus being adapted to respectively cooperate with the edges of said notches so as to laterally shear away a bent portion of the record, and means for driving said blade supporting means.

2. Record perforating apparatus; comprising a frame, a shear block assembly secured to said frame and being formed along one side with a plurality of laterally spaced open side notches, a plurality of shear blades, means mounted on said frame for supporting said blades for continuous unidirectional lateral swinging movement through the respectively associated notches of said shear block assembly, means on said blade supporting means for moving each of said blades from an inoperative position to an operative position, the effective contours of said notches being respectively defined by the surfaces generated by the swinging movement of the outer ends of the operatively positioned blades, the outer end of each blade thust being able to shearingly cooperate with the edges defining an associated one of said notches, and means for driving said blade supporting means.

3. Record perforating apparatus; comprising a frame, a shear block assembly mounted on said frame and provided along one edge with a plurality of laterally spaced open sided notches, a rotor rotatably mounted on said frame, a plurality of shear blades movably mounted on said rotor, means for respectively moving said shear blades from inoperative positions to operative positions as said blade ends swing unidirectionally through said notches, the effective contours of said notches being respectively generated by the surfaces of revolution of the outer ends of the operatively positioned laterally swinging blades, the outer ends of said blades thus being able to shearingly cooperate with said notches respectively when said rotor is rotated, means for rotatably driving said rotor, and means for feeding a record along a bent path past the said edge of said shear block assembly.

4. A record tape perforating apparatus; comprising a frame, a shear block assembly mounted on said frame and formed along one edge with a plurality of laterally spaced open sided notches, a set of shear blades having outer ends which are adapted to respectively cooperate with said notches, a rotor rotatably mounted in said frame and supporting said blades for lateral swinging movement past said notches, blade indexing means on said rotor for moving each of said blades to operative and inoperative positions, the contour of the shearing edges of said notches respectively being defined by a portion of the surface of revolution of the outer ends of said blades when the latter are in the respective operative positions, drive means for said rotor for swinging the ends of the operatively positioned blades unidirectionally through the respectively associated notches of said shear block assembly, and means for feeding a record tape along a bent path past said notched edge of said shear block assembly.

5. Apparatus as defined by claim 4; additionally comprising means for intermittently driving the record feeding means in timed relation to the operation of said rotor drive means.

6. Apparatus as defined by claim 4; additionally comprising means for driving said record feeding means, and means for interconnecting the record and rotor drive means so that a tape shearing action is caused by the simultaneous movement of the shear blades and record tape, said simultaneous movement together with a predetermined contour for said surface of revolution effectively combining to generate the desired configuration for each perforation in the record tape.

7. Apparatus as defined by claim 4 wherein said blade indexing means comprises a plurality of solenoids and a plurality of brush and commutator disc control units for respectively electrically controlling the operation of said solenoids.

8. Apparatus as defined by claim 4; additionally comprising a second set of shear blades movably mounted on said rotor, and means interconnecting the corresponding blades of said sets so that when one blade of one of said sets is moved to an operative position the corresponding blade of the other of said sets is moved to an inoperative position.

9. Apparatus as defined by claim 4; additionally comprising a second set of shear blades movably mounted on said rotor, and means interconnecting the blades of one of said sets to the corresponding blades of the other of said sets so that the centrifugal forces experienced by the said blade sets tend to balance one another.

10. Apparatus as defined by claim 4 wherein said shear block assembly comprises two laterally spaced portions, each of which is notched along their mutually adjacent edges so that the notches in one of said portions are coextensive with the respectively associated notches formed in the other of said portions, the record tape being adapted to be fed around the notched edge of one of said portions and then between the two adjacent side faces of said spaced block portions.

11. Apparatus as defined by claim 3 wherein the shear block notches and the outer ends of said blades have similar profiles that are defined by a portion of an arc.

12. Apparatus as defined by claim 3; additionally comprising means for driving said record feeding means, and means interconnecting said record feeding drive means and said rotor drive means for simultaneously continuous timed operation.

13. Apparatus as defined by claim 3; additionally comprising means intermittently driving the record feeding means in timed relation to the rotation of said rotor.

References Cited in the file of this patent

UNITED STATES PATENTS

| | | |
|---|---|---|
| 1,441,708 | Overbury | Jan. 9, 1923 |
| 2,637,397 | Welk | May 5, 1953 |
| 2,946,380 | Scribner | July 26, 1960 |